(12) United States Patent
Hayakawa et al.

(10) Patent No.: US 9,476,394 B2
(45) Date of Patent: Oct. 25, 2016

(54) MOTOR STATOR BOBBIN

(71) Applicant: DENSO CORPORATION, Kariya, Aichi-pref. (JP)

(72) Inventors: Tetsuo Hayakawa, Kariya (JP); Eiji Miyazaki, Hazu-gun (JP)

(73) Assignee: DENSO CORPORATION, Kariya (JP)

(*) Notice: Subject to any disclaimer, the term of this patent is extended or adjusted under 35 U.S.C. 154(b) by 186 days.

(21) Appl. No.: 14/291,275

(22) Filed: May 30, 2014

(65) Prior Publication Data

US 2014/0363320 A1   Dec. 11, 2014

(30) Foreign Application Priority Data

Jun. 5, 2013   (JP) .................................. 2013-118960

(51) Int. Cl.
| | |
|---|---|
| *F02M 37/08* | (2006.01) |
| *F02M 37/10* | (2006.01) |
| *H02K 3/34* | (2006.01) |
| *H02K 3/46* | (2006.01) |
| *H02K 7/14* | (2006.01) |
| *F02M 69/02* | (2006.01) |
| *H02K 3/18* | (2006.01) |
| *H02K 3/52* | (2006.01) |

(52) U.S. Cl.
CPC ............ *F02M 69/02* (2013.01); *F02M 37/08* (2013.01); *H02K 3/18* (2013.01); *H02K 3/46* (2013.01); *H02K 3/52* (2013.01); *H02K 3/522* (2013.01); *F02M 2037/082* (2013.01); *F02M 2037/085* (2013.01); *H02K 2203/12* (2013.01)

(58) Field of Classification Search
CPC ................. F02M 37/08; F02M 69/02; F02M 2037/085; F02M 2037/082; H02K 3/522; H02K 2203/12; H02K 3/18; H02K 3/46; H02K 3/52

USPC ........................................................ 310/194
See application file for complete search history.

(56) References Cited

U.S. PATENT DOCUMENTS

| 2004/0084988 A1* | 5/2004 | Sheeran | H02K 1/148 29/596 |
|---|---|---|---|
| 2007/0103014 A1 | 5/2007 | Sumiya et al. | |
| 2007/0176511 A1* | 8/2007 | Sakai | H02K 1/148 310/216.008 |

FOREIGN PATENT DOCUMENTS

| JP | 2002-125353 | 4/2002 |
|---|---|---|
| JP | 2004-350450 | 12/2004 |

(Continued)

OTHER PUBLICATIONS

Office Action (2 pages) dated Apr. 21, 2015, issued in Japanese Application No. 2013-118960 and English translation (3 pages).

*Primary Examiner* — Charles Freay
*Assistant Examiner* — Thomas Cash
(74) *Attorney, Agent, or Firm* — Nixon & Vanderhye P.C.

(57) ABSTRACT

A motor includes a stator with a bobbin. The bobbin has a lower end winding portion, a head part retainer portion that retains a head part of a winding, and a control portion disposed between the lower end winding portion and the head part retainer portion. A head part retainer surface formed on a pump part side of the head part retainer portion and an end face formed on a pump part side of the control portion are positioned on the same plane and on a pump part side relative to a winding retainer surface that is formed on a pump part side of the lower end winding portion. Thus, when the winding is wound in layers onto the winding retainer surface of the bobbin, collapsing of a middle part of the winding onto the head part of the winding is prevented.

10 Claims, 8 Drawing Sheets

(56) References Cited

FOREIGN PATENT DOCUMENTS

| JP | 2007336757 A | * | 12/2007 |
| JP | 2011-142770 | | 7/2011 |
| JP | 2012-34500 | | 2/2012 |
| JP | 2013-70577 | | 4/2013 |

* cited by examiner

MOTOR STATOR BOBBIN

CROSS REFERENCE TO RELATED APPLICATION

The present application is based on and claims the benefit of priority of Japanese Patent Application No. 2013-118960, filed on Jun. 5, 2013, the disclosure of which is incorporated herein by reference.

TECHNICAL FIELD

The present disclosure generally relates to a motor and a fuel pump using the same.

BACKGROUND INFORMATION

Generally, electric current supplied to the windings of a bobbin on a stator are continuously switched in order to switch a magnetic field within an electric motor. The switching of the magnetic field causes rotation of a rotor that is positioned inside of the stator. For example, an electric motor disclosed in a patent document 1 (i.e., Japanese Patent Laid-Open No. 2002-125353) has windings that are wound on a winding part of a bobbin, in which the winding part has a guide groove for retaining the winding.

However, in the electric motor in the patent document 1, the winding is wound on the winding part in plural layers. Further, the winding is not actually retained on the winding part except for the first layer of the winding, which is closest to the winding part. Therefore, the winding may possibly collapse in the course of being wound on the winding part. That is, the shape of the winding may become disorderly and out of shape.

SUMMARY

It is an object of the present disclosure to provide a motor which prevents windings from collapsing on the bobbin.

In an aspect of the present disclosure, a motor includes a rotor and a stator positioned around the rotor and generating a magnetic field to rotate the rotor. The stator includes a plurality of cores made of a magnetic material, a plurality of windings wound on the plurality of cores, and a plurality of bobbins. Each bobbin electrically insulates each winding of each core. Further, each bobbin includes a head part retainer portion retaining a head part of each winding at a circumferential position of the bobbin, the head part of each winding being a starting point of each winding, a winding portion retaining a middle part of each winding, the middle part being in connection with the head part of each winding, and a control portion extending relative to the winding portion in an axial direction of the rotor from a position between the head part retainer portion and the winding portion. The control portion prevents movement of the middle part of each winding toward the head part retainer portion.

When the winding is wound on the bobbin, the winding portion of the bobbin has the middle part of the winding layered (i.e., wound in layers thereon) in plural layers. Thus, an upper layer of the middle part winding is wound on a lower layer of the middle part winding that is already being wound on the winding portion of the bobbin, which makes a position of the upper layer windings unstable. More specifically, since the head part retained on the head part retainer portion is wound on the bobbin as one layer of winding (i.e., to form only one layer), the middle part wound next to and on top of the head part may collapse onto the head part during a winding process, which may especially be true for the upper-most layers in the plural-layered winding structure. However, the motor in the present disclosure has a control portion that is disposed to extend from a position between the head part retainer portion and the winding portion toward an axis of the rotor relative to the winding portion. Therefore, by having the control portion formed in such manner, movement of the middle part in the upper-most layers is controlled and restricted. As a result, collapsing of the middle part onto the head part during a winding process of the winding is prevented.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, an embodiment of the present disclosure is described based on the drawings.

One Embodiment

A fuel pump using a motor is described based on FIGS. 1-9B as one embodiment of the present disclosure.

Figure 1:
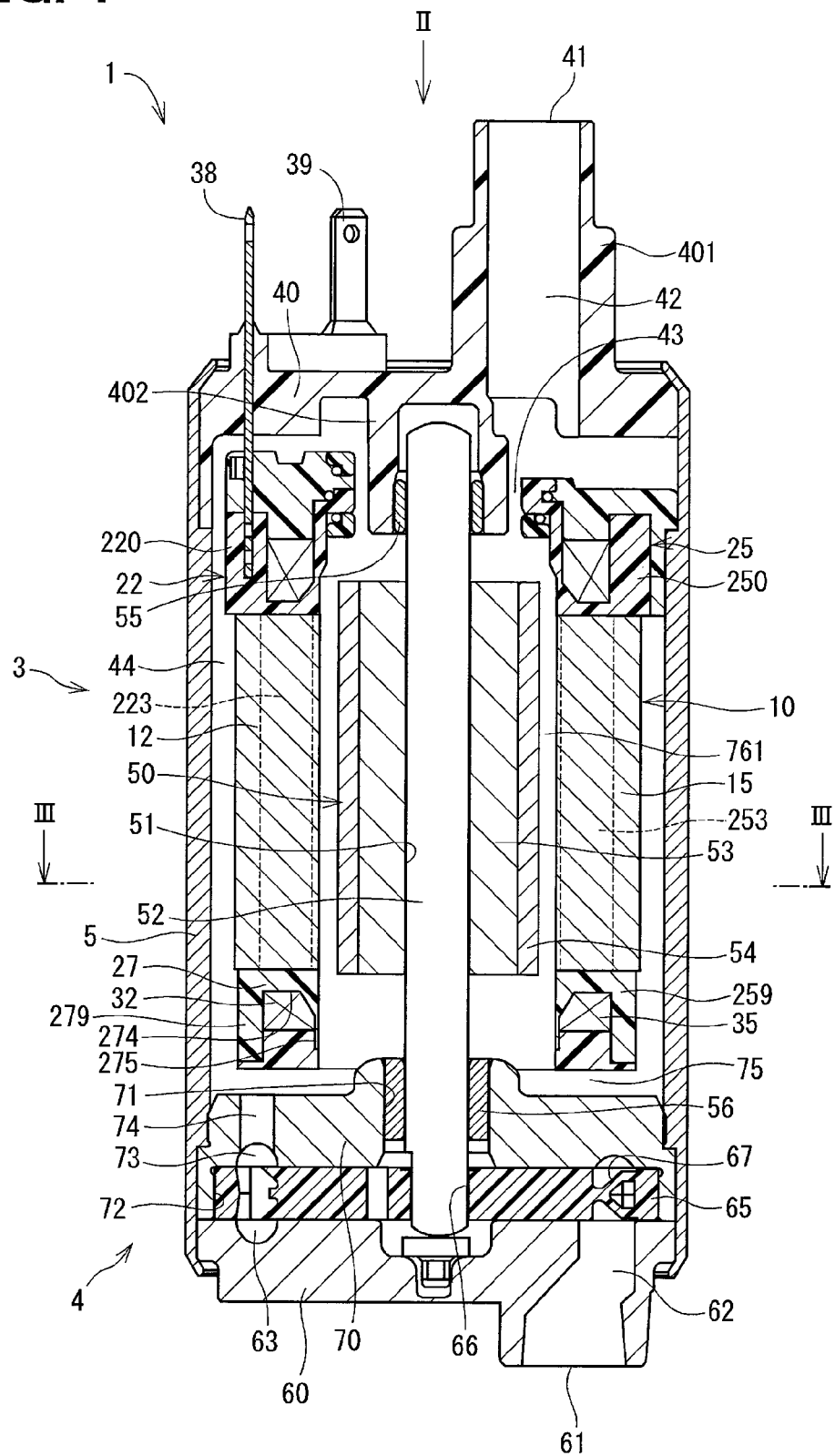
FIG. 1 is a sectional view of a fuel pump that uses a motor in one embodiment of the present disclosure.
Figure 2:
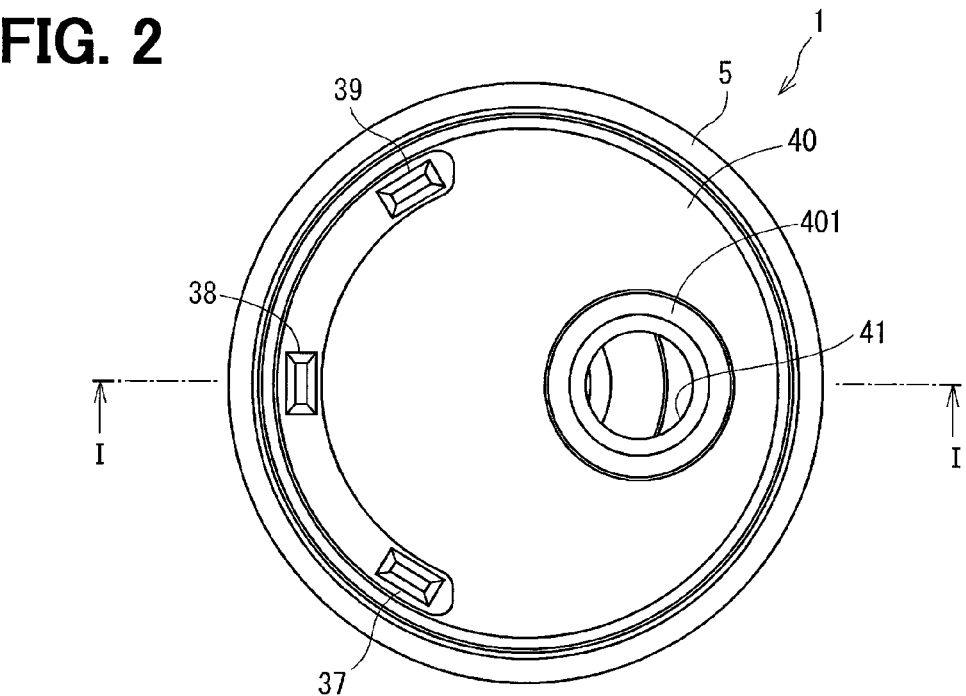
FIG. 2 is a top view of the fuel pump along an arrow II in FIG. 1.
Figure 3:
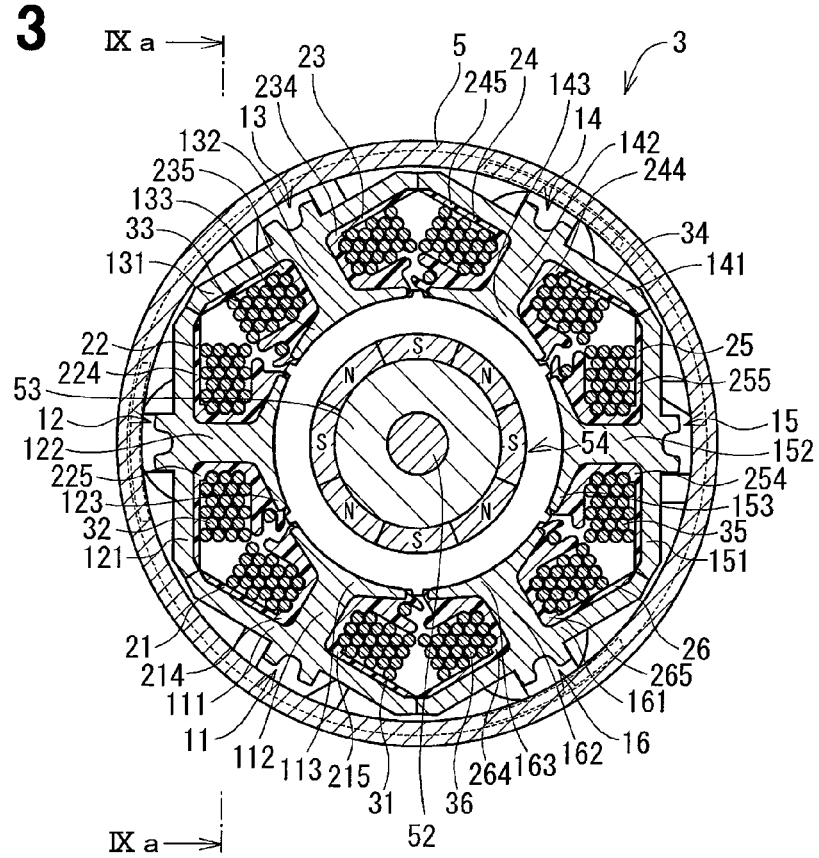
FIG. 3 is a sectional view of the fuel pump along a line III-III in FIG. 1.

First, a configuration of a fuel pump is explained based on FIGS. 1-3. A fuel pump 1 comprises a motor part 3, a pump part 4, a housing 5, a pump cover 60, a cover end 40, together with other parts. In the fuel pump 1, the motor part 3 and the pump part 4 are accommodated in a space formed by the housing 5, the pump cover 60, and the cover end 40.

The housing 5 is formed in a cylindrical shape from metal, such as iron.

The pump cover 60 covers one end of the housing 5, i.e., is disposed on an end that has a suction opening 61. The pump cover 60, serving as a suction portion in the claims, is fixed onto the housing 5 with a periphery of the housing 5 on one side close to the suction opening 61 caulked inwardly, which captures the cover 60 in an inside of the housing 5, not allowing the cover 60 to be pulled out along an axial direction.

The cover end 40 is made of resin, and covers one end of the housing 5, which is the other end of the housing 5 close to a discharge opening 41. The cover end 40, serving as a discharge portion in the claims, is fixed onto the housing 5 with a periphery of the housing 5 on the other side close to the discharge opening 41 caulked inwardly, which captures the cover end 40 in an inside of the housing 5, not allowing the cover end 40 to be pulled out along an axial direction.

On an outside of the cover end 40, a cylinder portion 401 which projects in an upper direction in FIG. 1 is formed. The cylinder portion 401 forms a discharge passage 42 which communicates with an inside of the housing 5, and also forms the discharge opening 41 which allows communication between the discharge passage 42 and an outside of the housing 5. In an inside of the cover end 40, a cylinder portion 402 which projects in a cylindrical shape along a direction toward the pump portion 4 is formed on an axis of the housing 5. In an inside of the cylinder portion 402, a bearing 55 is fixedly inserted.

Next, a configuration of the motor portion 3 is explained.

The motor portion 3 comprises a stator 10, a rotor 50, and a shaft 52, together with other parts. The motor portion 3 is a brush-less motor, and, when an electric power is supplied thereto, the stator 10 generates a rotating magnetic field, and the rotor 50 rotates together with the shaft 52.

The stator 10 is formed approximately in a cylindrical shape, and is accommodated inside of the housing 5. The stator 10 has six cores, six bobbins, six windings, together with other parts. The stator 10 is formed as one integrated body that is molded by resin, for integrating the six cores, the six bobbins, and the six windings.

The six cores 11, 12, 13, 14, 15, 16 are respectively formed as a stack of plural board shape metals stacked along an axial direction of the stator 10. The material of board shape metals may be iron, for example. The cores 11, 12, 13, 14, 15, 16 are respectively positioned to face a magnet 54 that is disposed on an outer radial portion of the rotor 50.

On each of the six cores, an outer ring portion, a connection portion, and an inner ring portion are formed. The outer ring portions 111, 121, 131, 141, 151, 161 are respectively formed on an outer radial portion of the core, and extend along a circumferential direction. The connection portions 112, 122, 132, 142, 152, 162 extend inwardly along the radial direction from the outer ring portions 111, 121, 131, 141, 151, 161, i.e., substantially from an inside center part of the outer ring portions 111, 121, 131, 141, 151, 161, respectively. The inner ring portions 113, 123, 133, 143, 153, 163 extend along the circumferential direction, on an inside of the connection portions 112, 122, 132, 142, 152, 162.

Bobbins 21, 22, 23, 24, 25, 26 are respectively made of resin material, and have respectively the cores 11, 12, 13, 14, 15, 16 inserted thereinto at the time of forming of those bobbins, to have one body structure. The bobbins 21, 22, 23, 24, 25, 26 respectively insulate windings 31, 32, 33, 34, 35, 36 from the cores 11, 12, 13, 14, 15, 16.

The bobbins 21, 22, 23, 24, 25, 26 have, respectively, an upper end portion disposed at a position close to the discharge opening 41, an insert portion into which the core is inserted, and a lower end portion disposed at a position close to the pump portion 4 of the core. As shown in FIG. 1, more specifically, the bobbin 22 comprises an upper end portion 220, an insert portion 223, and a lower end portion 27. Further, the bobbin 25 comprises an upper end portion 250, an insert portion 253, and a lower end portion 259. The other bobbins 21, 23, 24, 26 respectively have the same structure, substantially.

The upper end portion of a bobbin is disposed to cover an end of the core which is close to the discharge opening 41. On the upper end portion, a positioning portion (not-illustrated) which restricts movement of a bridge line which electrically connects the six windings 31, 32, 33, 34, 35, 36, which is not illustrated. A "bridge line" mentioned here is, for example, a lead line made of the same material as the winding, for example, which is not wound on the bobbins 21, 22, 23, 24, 25, 26.

The insert portion is formed to cover an inside wall of the outer ring portion of the core, which may be defined as an inner radial wall of the core, a side wall of the connection portion, which may be defined as walls on both sides of the core along a circumferential direction, and an outside wall of the inner ring portion of the core, which may be defined as an outer radial wall of the core. The insert portions are, as shown in FIG. 3, the first insert portions 214, 224, 234, 244, 254, 264 and the second insert portions 215, 225, 235, 245, 255, 265, on which the winding 31, 32, 33, 34, 35, 36 are respectively wound.

The lower end portion is disposed to cover an end of the core close to the pump portion 4.

Figure 7A:
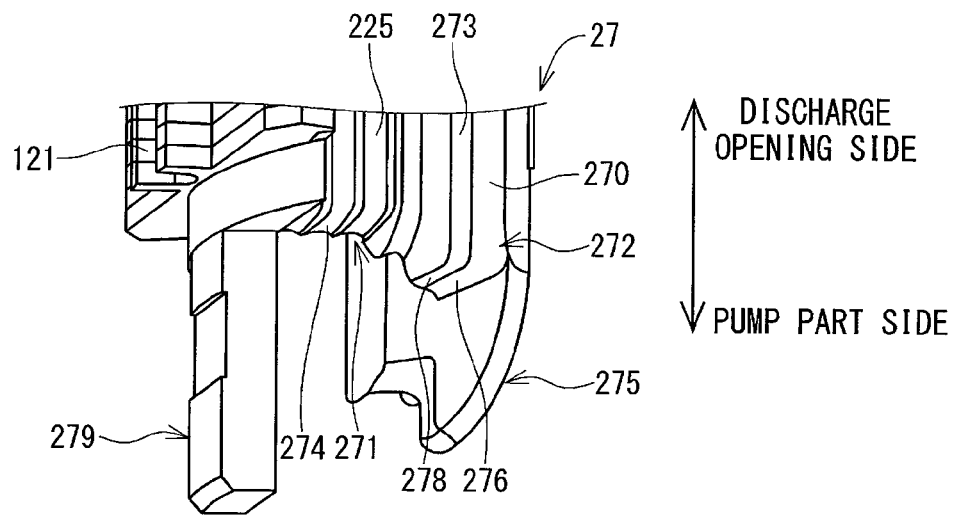
FIGS. 7A/B are perspective views of a bobbin of the motor in one embodiment of the present disclosure.
Figure 8A:
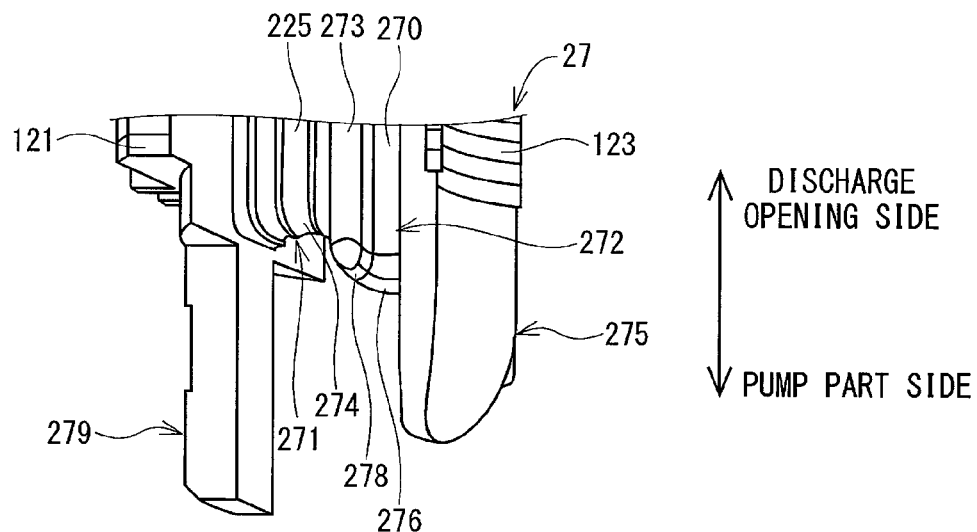
FIGS. 8A/B are perspective views of the bobbin of the motor in one embodiment of the present disclosure, which are seen from a different direction than FIGS. 7A/B.
Figure 9A:
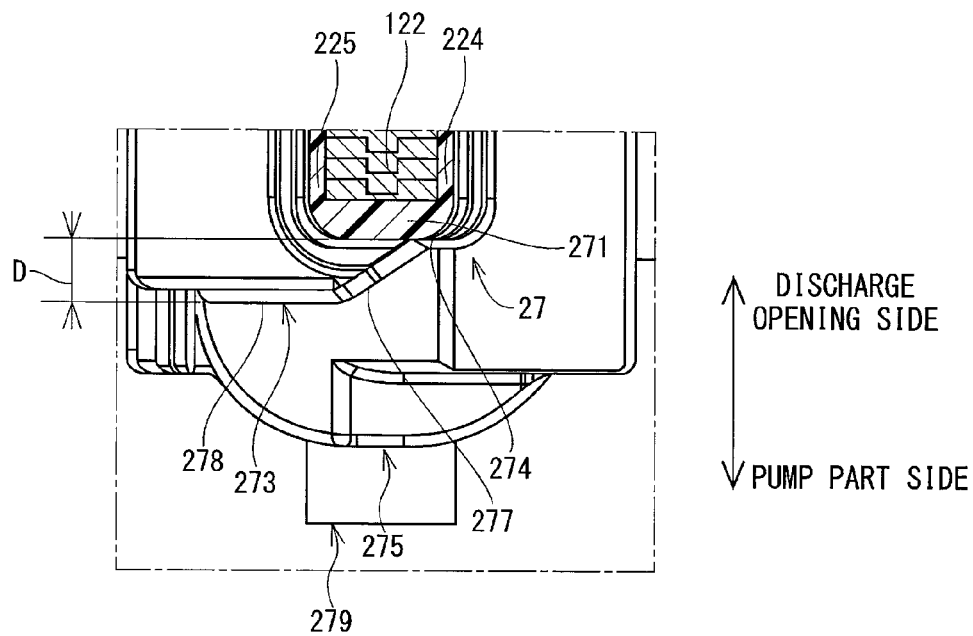
FIGS. 9A/B are enlarged views of the bobbin of the motor in one embodiment of the present disclosure.
Figure 9B:
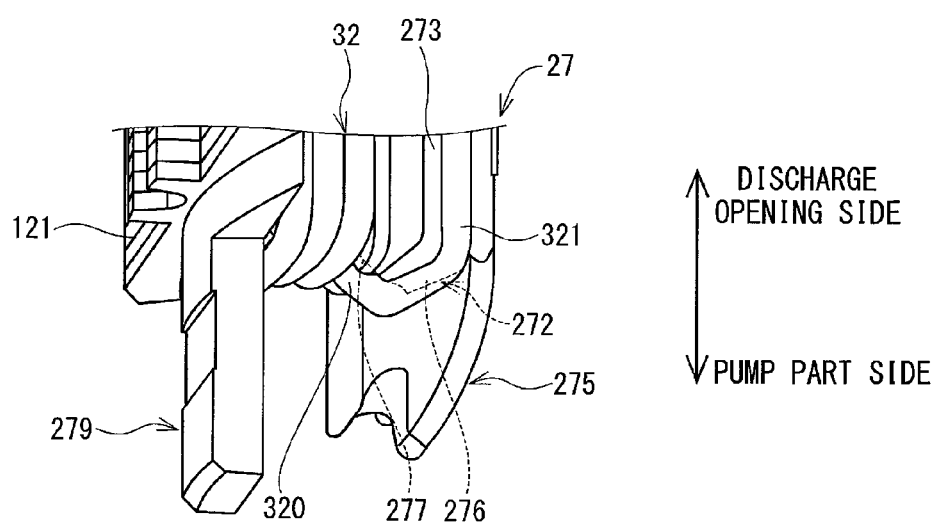

Here, based on FIGS. 7A/B to 9A/B, the shape of the lower end portion of a bobbin is explained in detail. FIGS. 7A/B are the perspective views of the lower end portion 27 of the bobbin 22 seen from a viewpoint on an outside of the second insert portion 225. FIGS. 8A/B are the perspective views of the lower end portion 27 of the bobbin 22 seen from a viewpoint on an inside of the second insert portion 225. FIG. 9A is a cross section taken along a line IXa-IXa in FIG. 3. FIG. 9B is an illustration of a state of how the winding 32 is wound on the bobbin 22.

The lower end portion 27 has a lower end winding portion 271 that connects the first insert portion 224 and the second insert portion 225 on a pump portion 4 side of the core 12, a head part retainer portion 272 retaining a head part 321 that serves as a starting point to begin the winding of the winding 32, a control portion 273 disposed as a portion between the lower end winding portion 271 and the head part retainer portion 272, an inner guide wall 275 formed on a pump portion 4 side of the inner ring portion 123 of the core 12, an outer guide wall 279 formed on an outer radial portion of the lower end portion 27, together with other parts.

The lower end winding portion 271 is formed at a position that is substantially a center of the lower end portion 221. The lower end winding portion 271 has a winding retainer surface 274 that is substantially perpendicular to a center axis of the rotor 50, which is aligned with a center axis of the stator 10. On top of the winding retainer surface 274, a middle part of the winding 32 that is wound from the second insert portion 225 to the first insert portion 224 is disposed in layers. In the above, the "middle part" of the winding 32 indicates a part of the winding 32 between the head part 321 and an end part of the winding 32 which is wound on the first insert portion 224 and on the second insert portion 225.

The head part retainer portion 272 is disposed on an inner edge (i.e., portion) of a circumferentially extending element of the bobbin 22 on a radially inner portion relative to the lower end winding portion 271. Specifically, the head part retainer portion 272 is formed on an edge of the inner guide wall 275, which is on an element extending in a circumferential direction. Further, from the head part retainer portion 272, a groove 270 which can retain the head part 321 extends in a direction that is substantially in parallel with the axis of the rotor 50. The groove 270 is formed from the upper end portion 220 of the bobbin 22 to the lower end portion 27 through the insert portion 223. Further, the head part retainer portion 272 has a head part retainer surface 276 that is formed substantially perpendicularly to the axis of the rotor 50. The head part 321 is disposed on the head part retainer surface 276.

The control portion 273 is formed as a part of the head part retainer portion 272, and is formed as a portion between the lower end winding portion 271 and the head part retainer portion 272. The control portion 273 has an end face 278 that is formed substantially perpendicularly to the axis of the rotor 50. The end face 278 is formed on the same plane as a surface 227 of the head part retainer portion 222.

In the fuel pump 1 of the present embodiment, the control portion 273 and the head part retainer portion 272 are formed to extend further in the axis direction of the rotor 50 than the lower end winding portion 271. As shown in FIG. 9A, specifically, the end face 278 of the control portion 273 and the head part retainer surface 276 of the head part retainer portion 272 are formed as a part that extends toward a pump portion 4 side relative to the winding retainer surface 274 of the lower end winding portion 271, and a distance D is defined between (i) the end face 278 or the head part retainer surface 276 and (ii) the winding retainer surface 274 along the axis direction of the rotor 50. The distance D is formed to be equal to or greater than a cross-sectional radius of the winding 32. Therefore, when the winding is wound on the bobbin, the collapse of the middle part of the winding is prevented by the control portion 273 and the head part retainer surface 276.

Further, the head part retainer surface 276 and the winding retainer surface 274 are connected by a slope 277, as shown in FIG. 9A. As shown in FIG. 9B, on the slope 277, a head-to-middle part 320 of the winding 32 which connects the head part 321 of the winding 32 and a middle part 322 of the winding 32 is disposed.

Returning to FIGS. 1-3, the windings 31, 32, 33, 34, 35, 36, which are copper wires and a surface of each of which is covered with an insulating coating, are wound on the bobbins 21, 22, 23, 24, 25, 26, for example. More specifically, a winding with its head part retained in the head part retainer part of the bobbin is wound on the bobbin in a concentrated manner from the first insert portion through the upper end portion, the second insert portion, the lower end portion to pass the first insert portion again. The winding procedure of the winding onto a bobbin is mentioned later.

A W-phase terminal 37 and a V-phase terminal 38 and a U-phase terminal 39 are formed at respective positions that do not interfere with the cylinder portion 401 of the cover end 40 as shown in FIG. 2, and are projected in the axial direction.

The W-phase terminal 37, the V-phase terminal 38, and the U-phase terminal 39 receive a supply of a three-phase-circuit electric power from a power unit (not-illustrated).

According to the present embodiment, the three-phase-circuit windings which form the magnetic circuit of the stator 10 is delta-connected, and two windings are connected in series between the respective phase terminals. That is, between the W-phase terminal 37 and the V-phase terminal, the winding 31 and the winding 34 are connected in series by using a bridge line. Further, between the V-phase terminal 38 and the U-phase terminal 39, the winding 32 and the winding 35 are connected in series by using a bridge line. Further, between the U-phase terminal 39 and the W-phase terminal 37, the winding 33 and the winding 36 are connected in series by using a bridge line.

The rotor 50 is rotatably accommodated in an inside of the stator 10. The rotor 50 has an iron core 53 around which a magnet 54 is disposed. As shown in FIG. 3, the magnet 54 has an N pole and an S pole alternatively arranged by turns along a circumferential direction. In the present embodiment, the rotor 50 has four pairs of N and S poles, totaling to 8 poles.

The shaft 52 is press-fitted into an axial hole 51 that is bored on the axis of the rotor 50, and rotates with the rotor 50.

The configuration of the pump portion 4 is explained in the following.

The pump cover 60 has the suction opening 61 in a cylindrical shape which opens toward a space that is illustrated as a lower portion of FIG. 1. In an inside of the suction opening 61, a suction passage 62 which pierces through the pump cover 60 along a board thickness direction is formed.

At a position between the pump cover 60 and the stator 10, a pump casing 70 is formed substantially in a disk shape. A hole 71 which extends through the pump casing 70 along a board thickness direction is formed at a central portion of the pump casing 70. A bearing 56 is fixedly inserted into the hole 71. The bearing 56 supports, together with the bearing 55 fixedly inserted in the cover end 40, both of the axial ends of the shaft 52 in a rotatable manner. Thereby, the rotor 50 and the shaft 52 are rotatable relative to the cover end 40 and the pump casing 70.

An impeller 65 is formed substantially in a disk shape with resin. The impeller 65 as a "rotating member" is accommodated in a pump room 72 between the pump cover 60 and the pump casing 70. At the center of the impeller 65, a D shape hole 66 is formed. Into the hole 66, a D shape end of the shaft 52 is inserted, which is made by cutting out one side of the shaft 52 on one end of the shaft close to the pump room 72. In such manner, the impeller 65 rotates in the pump room 72 together with the shaft 52.

A groove 63 which is connected to the suction passage 62 is formed on a surface of the pump cover 60 which faces the impeller 65. Further, a groove 73 is formed on a surface of the pump casing 70 which faces the impeller 65. The groove 73 communicates with a passage 74 which pierces through the pump casing 70 along a board thickness direction. A blade portion 67 is formed on the impeller 65 at positions corresponding to the groove 63 and the groove 73.

In the fuel pump 1, when the electric power is supplied to the windings 31, 32, 33, 34, 35, 36 of the motor portion 3, the impeller 65 rotates together with the rotor 50 and the shaft 52. Rotation of the impeller 65 introduces a fuel in a fuel tank (not-illustrated) which is disposed on an outside of the fuel pump 1 into the groove 63 via the suction opening 61. The fuel introduced into the groove 63 is, while being pressurized, further introduced into the groove 73 by the rotation of the impeller 65. The pressurized fuel passes through the passage 74, and is introduced into an intermediate room 75 which is disposed on a motor portion 3 side of the pump casing 70. The fuel introduced into the intermediate room 75 reaches the discharge passage 42 via a fuel path which vertically passes through the motor portion 3, and is discharged from the discharge opening 41.

Two fuel paths are formed in the fuel pump 1 in the present embodiment. One fuel path includes (i) a passage 761 between the outer wall of the rotor 50 and the wall of the stator 10 and (ii) a passage 43 between the outer wall of the cylinder portion 402 of the cover end 40 and the inner walls of the bobbins 21, 22, 23, 24, 25, 26. Another fuel path includes a passage 44 between the outer wall of the stator 10 and the inner wall of the housing 5.

Figure 4:
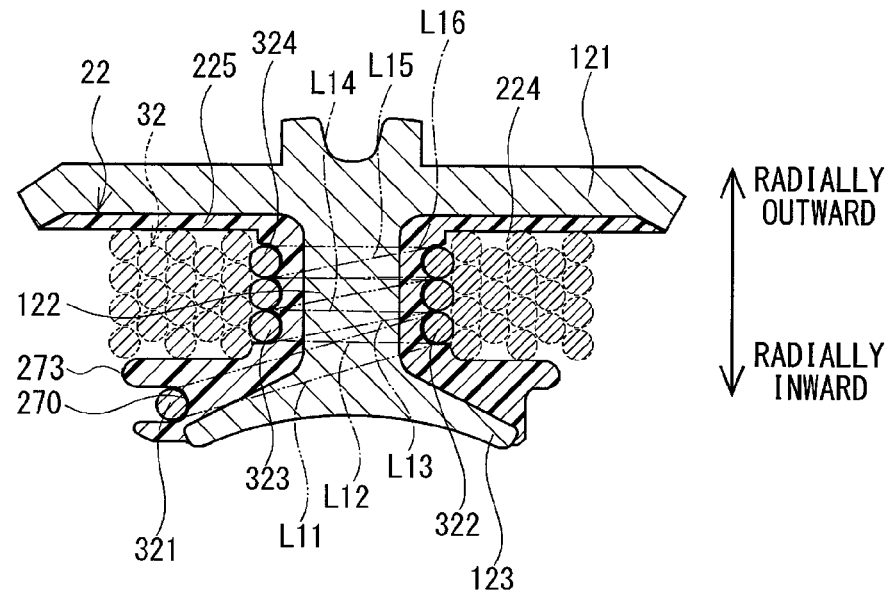
FIG. 4 is an illustration of how a winding in the motor is wound in one embodiment of the present disclosure.
Figure 5:
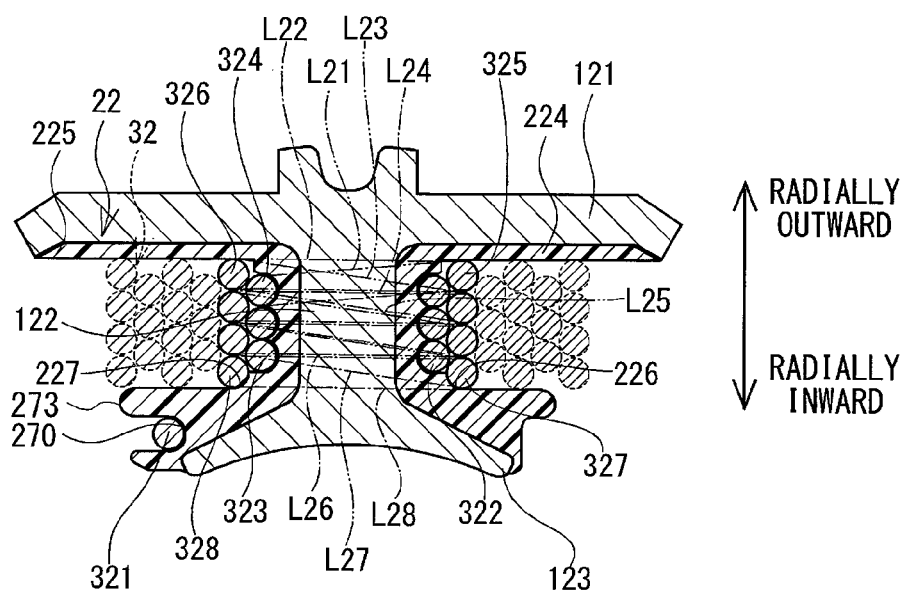
FIG. 5 is an illustration of how the winding in the motor is wound after a winding state in FIG. 4.
Figure 6:
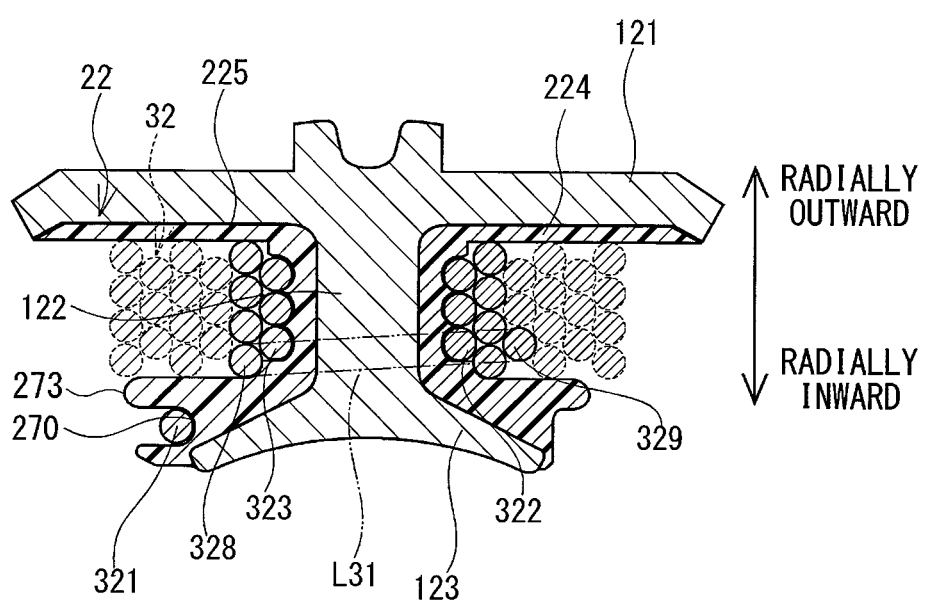
FIG. 6 is an illustration of how the winding in the motor is wound after a winding state in FIG. 5.

Next, a procedure for winding the winding on the bobbin in the present embodiment is explained based on FIGS. 4-9B. Here, explanation of the procedure is exemplified as the one for winding the winding 32 on the bobbin 22 that covers the core 12, for the brevity of description. The same procedure applies to the other windings 31, 33, 34, 35, 36 which are respectively wound on the other bobbins 21, 23, 24, 25, 26. In FIGS. 4-6, sectional views of the bobbin 22 in the present embodiment are shown, in which how the winding 32 is wound and positioned on the bobbin 22 is illustrated. In FIG. 4, a first state is shown, in which a first layer of the winding 32 is wound on the first insert portion 224 and the second insert portion 225. In FIG. 5, a second state transited from the first state in FIG. 4 is shown, in which a second layer of the winding 32 is wound. In FIG. 6, an after-second state in a middle of transition from the second state in FIG. 5 is shown, in which the winding 32 is wound from the second layer to a third layer. In the above, the phrase "in the first/second layer" indicates an order of closeness to the connection portion 122 of the core 12, when the winding 32 is wound on the first insert portion 224 and/or the second insert portion 225 in layers. That is, in other words, the winding 32 wound on the nearest position of the connection portion 122 of the core 12 is designated as the winding 32 in "the first layer".

When the winding 32 is wound on the bobbin 22, the winding 32 is firstly arranged from the upper end portion 220 toward the lower end portion 27 through the insert portion 223. At such time, the head part 321 of the winding 32 is accommodated in the groove 270, and is retained by the bobbin 22. The head part 321 accommodated in the groove 270 is bent substantially by a right angle against the axis of the rotor 50 at the lower end portion 27, and is positioned on and along the head part retainer surface 276 (refer to FIG. 9B). Then, the head-to-middle part 320 connected to the head part 321 is positioned on and along the slope 277, and the middle part 322 connected to the head-to-middle part 320 is wound on the first insert portion 224.

Then, the middle part 322 connected to the head-to-middle part 320 is arranged at a position nearest to the connection portion 122 of the core 12, which is an inner-most radial position of the first insert portion 224, as shown in FIG. 4. That is, the winding 32 between the head part 321 and the middle part 322 is positioned on a lower end portion 27 side, i.e., on a far side of illustration in FIG. 4, which is shown in a two-dot chain line L11.

Then, a middle part 323 connected to the middle part 322 is arranged at a position nearest to the connection portion 122 of the core 12, which is an inner-most radial position of the second insert portion 225. At such time, the winding 32 between the middle part 322 and the middle part 323 is positioned on an upper end portion 220 side, i.e., on a near side of illustration in FIG. 4.

Then, the middle part 323 of the winding 32 in the first layer is wound through the lower end portion 27 side and the upper end portion 220 side in order. In the present embodiment of the fuel pump 1, the winding 32 in the first layer is arranged in three rows. Further, in FIG. 4, a portion of the winding 32 in the first layer which passes on the upper end portion 220 side to be wound on wound on the first insert portion 224 and the second insert portion 225 is shown by one-dot dashed lines L12, L14, L16, and the other portion of the winding 32 in the first layer which passes on the lower end portion 27 side to be wound on the first insert portion 224 and the second insert portion 225 is shown by two-dot dashed lines L11, L13, L15.

Then, a middle part 325 connected to a middle part 324, which (324) is arranged at a position nearest to the connection portion 122 of the core 12 at an outer-most radial position of the second insert portion 225, is, as shown in FIG. 5, arranged as the middle part in the second layer on an outside of the middle part in the first layer when seen from the connection portion 122 of the core 12, which is an outer-most radial position of the first insert portion 224. At such time, the winding 32 between the middle part 324 and the middle part 325 is positioned on the lower end portion 27 side, i.e., on a back side of illustration in FIG. 5.

Then, a middle part 326 connected to the middle part 325 is wound as the winding 32 in the second layer at a position outside of the middle part in the first layer when seen from the connection portion 122 of the core 12, which is an outer-most radial position of the second insert portion 225. At such time, the winding 32 at a position between the middle part 325 and the middle part 326 is positioned on the upper end portion 220 side, i.e., on a near side of illustration in FIG. 5.

Then, the middle part of the winding 32 in the second layer passes through the lower end portion 27 side and the upper end portion 220 side in order, to be wound. At such time, middle parts 327 and 328 which are portions of the winding 32 wound in the second layer at an inner-most radial position are retained by a groove 226 that is formed on a side wall of the first insert portion 224 and a groove 227 formed on a side wall of the second insert portion 225, with which the movement of the middle parts 327, 328 are restricted to certain degree. In the fuel pump 1 of the present embodiment, the winding 32 in the second layer is arranged in four rows. Further, in FIG. 5, a portion of the winding 32 which passes on the upper end portion 220 side is shown by one-dot dashed lines L22, L24, L26, L28 and the other portion of the winding 32 which passes on the lower end portion 27 side is shown by two-dot dashed lines L21, L23, L25, L27.

Figure 7B:
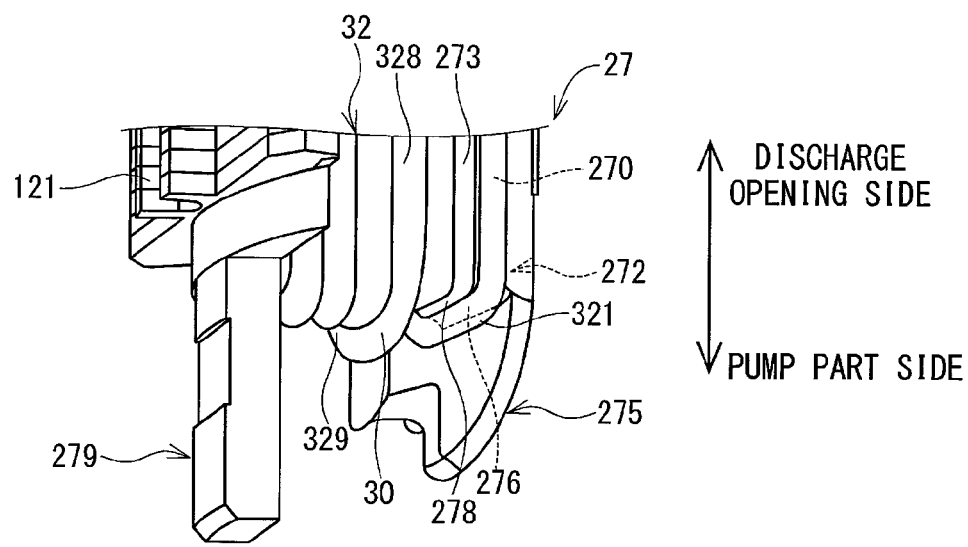
Figure 8B:
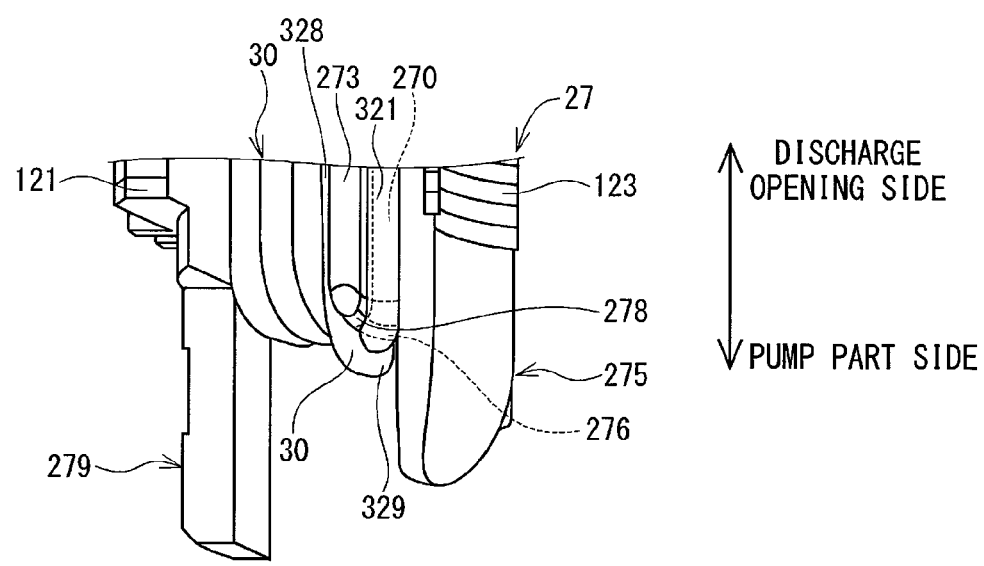

Then, a middle part 329 connected to a middle part 328, which (i.e., middle part 328) is positioned at an inner-most radial position of the second insert portion 225, is, as shown in FIG. 6, arranged as the middle part in the third layer on an outside of the middle part in the second layer when seen from the connection portion 122 of the core 12, which is an outer-most radial position of the first insert portion 224. At such time, the middle part 30 which is the winding 32 between the middle part 328 and the middle part 329 passes on the lower end portion 27 side, i.e., on the back side of illustration in FIG. 6, as shown in a two-dot dash line L31 of FIG. 6. More specifically, as shown in FIGS. 7B and 8B, the middle part 30 is wound on top of the winding 32 which is already wound in two layers at an inner-most radial position on the winding retainer surface 274. At such time, radially inward movement of the middle part 30 is restricted by the control portion 273 formed to extend toward the pump portion 4 from the winding retainer surface 274 and by the head part 321 positioned on the head part retainer surface 276.

Then, the winding 32 is wound on the first insert portion 224, the upper end portion 220, the second insert portion 225, and the lower end portion 27 in order, and, as shown in FIG. 3, the winding 32 is wound on the bobbin 32 in six layers.

Figure 10A:
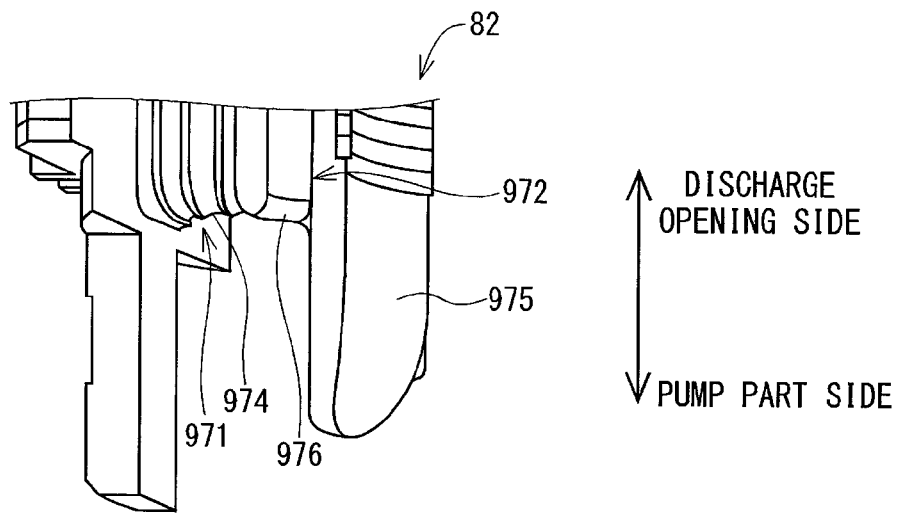
FIGS. 10A/B are enlarged views of the bobbin of a motor in a comparative example.
Figure 10B:
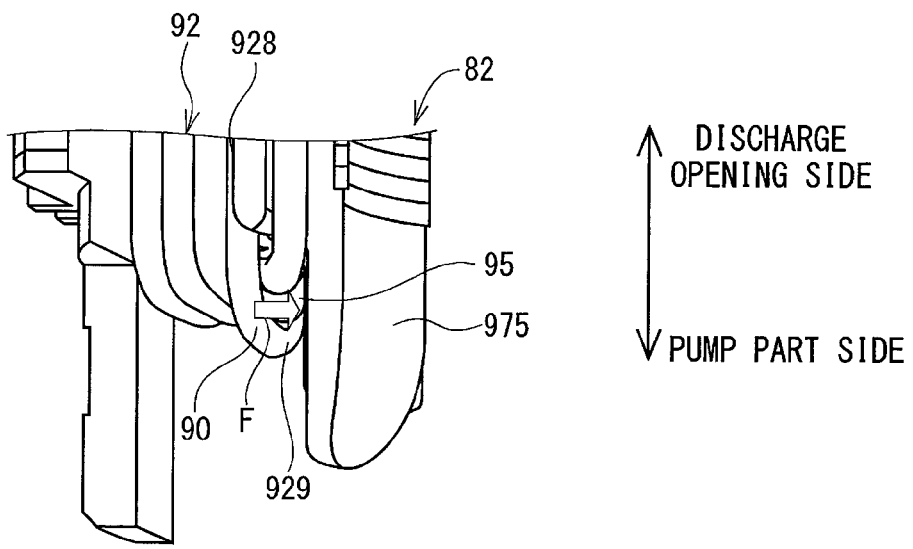

Here, as a comparative example, a fuel pump having no control portion between the lower end winding portion and the head part retainer portion is explained. In FIGS. 10A/B, enlarged views of the lower end portions of the bobbin of the core are shown. Specifically, FIG. 10A shows a perspective view of a bobbin 82 before having a winding 92 wound thereon. In FIG. 10A, the perspective view is taken from the same angle as the view in FIG. 8A which is an enlarged view of the lower end portion 27 of the bobbin 22 of the fuel pump 1 in the present embodiment. FIG. 10B shows a perspective view of the bobbin 82 in which the winding 92 is already wound thereon. In FIG. 10B, a perspective view is taken from the same angle as the view in FIG. 8B which is an enlarged view of the lower end portion 27 of the bobbin 22 of the fuel pump 1 in the present embodiment.

In the bobbin 82 of the fuel pump of the comparative example, a winding retainer surface 974 of a lower end winding portion 971 and a head part retainer surface 976 of a head part retainer portion 972 are formed to have the same height. Further, at a position between the winding retainer surface 974 and the head part retainer surface 976, no control portion is disposed, which is the one on the bobbin of the motor portion 3 of the fuel pump 1 in the present embodiment. Due to the structure described above, as shown in FIG. 10B, a middle part 90 that is the winding 92 at a position between one portion of the winding 92 which is wound in the second layer on the second insert portion as a middle portion 928 and the other portion of the winding 92 which is wound in the third layer on the first insert portion as a middle portion 929 and an inner guide wall 975 are interposed with a gap space 95, which allows the movement of the middle part 90 in an arrow F direction, thereby a collapse of the winding 92 during the winding operation is likely.

In the fuel pump 1 of the present embodiment, the control portion in the lower end portion of the bobbin is formed to extend in the axial direction of the rotor 50 in comparison to the lower end winding portion. Therefore, the movement of the middle part wound in many layers on the winding retainer surface is restricted, thereby preventing the movement of the winding into the space that is formed on a pump side of the head part of the winding. Thus, the collapse at the time of winding the winding is prevented.

Further, the head part retainer surface of the head part retainer portion is formed to have the same height as the end face of the control portion. Therefore, the head part of the winding which is positioned on the winding retainer surface, in addition to the height of the control portion on the winding retainer surface, contributes to a prevention of the collapse of the winding.

Further, the head part retainer surface of the head part retainer portion is connected to the winding retainer surface of the lower end winding portion by the slope. The head part on the head part retainer surface and the middle part wound on the first insert portion are connected by the head-to-middle part of the winding on the slope. Thereby, the head part, the head-to-middle part, and the middle part wound in the first layer of the first insert portion are arranged naturally, and the gap space formed at the connection position between the head part and the middle part is made smaller. Therefore, the collapse of the winding is further prevented.

Further, the distance D between the end face of the control portion and the head part retainer surface of the head part retainer portion is configured to be equal to or greater than the cross-sectional radius of the winding. Therefore, the winding is wound in six layers on the bobbin, as seen in the fuel pump 1 in the present embodiment, the collapse of the middle part of the winding extending from the second layer to the third layer is prevented by the control portion and the head part retainer surface.

Other Embodiments (a) According to the above-mentioned embodiment, the motor of the present disclosure is used for a fuel pump. However, the use of the motor is not limited thereto. The motor of the present disclosure may be usable in any motor, as long as the motor has a stator on which the winding is wound.

(b) According to the above-mentioned embodiment, the head part retainer surface of the head part retainer portion has the same height as the end face of the control portion. However, the height of the head part retainer surface is not limited thereto. The height may be lower than the end face of the control portion.

(c) According to the above-mentioned embodiment, the head part retainer surface of the head part retainer portion and the winding retainer surface of the lower end winding portion are connected by the slope. However, the shape of a portion which connects the head part retainer surface and the winding retainer surface is not limited thereto. The portion for connecting the two portions may have a shape other than the slope.

(d) According to the above-mentioned embodiment, the distance between the end face of the control portion and the head part retainer surface of the head part retainer portion is configured to be equal to or greater than the cross-sectional radius of the winding. However, the distance concerned is not limited thereto. The distance may be smaller than the cross-sectional radius of the winding.

(e) According to the above-mentioned embodiment, the winding is wound in six layers on the bobbin, and the number of rows in one layer is either three rows or four rows. However, the number of the layers of the winding and the number of rows of the winding per layer which are not limited thereto.

Such changes and modifications are to be understood as being within the scope of the present disclosure as defined by the appended claims.

What is claimed is:
1. A motor comprising:
a rotor; and
a stator positioned around the rotor and generating a magnetic field to rotate the rotor, the stator including
a plurality of cores made of a magnetic material,
a plurality of windings wound on the plurality of cores, and
a plurality of bobbins, each bobbin electrically insulating each winding of each core, and
each bobbin including
a head part retainer portion retaining a head part of each winding at a circumferential position of the bobbin, the head part of each winding being a starting point of each winding,
a winding portion retaining a middle part of each winding, the middle part being in connection with the head part of each winding, and
a control portion extending relative to the winding portion in an axial direction of the rotor from a position between the head part retainer portion and the winding portion, wherein
the control portion prevents movement of the middle part of each winding toward the head part retainer portion, and
the head part retainer portion includes a groove that is configured to retain the head part substantially parallel to the axis of the rotor, and wherein
the head part retainer portion includes only one of the groove, and wherein
the groove is circumferentially offset from a center of the winding portion.

2. The motor of claim 1, wherein
the head part retainer portion extends to a same axial position as the control portion in the axial direction of the rotor.

3. The motor of claim 2, further comprising:
a head part retainer surface of the head part retainer portion positioned perpendicular to the axial direction of the rotor;
a winding retainer surface of the winding portion positioned perpendicular to the axial direction of the rotor;
a slope surface connecting the head part retainer surface and the winding retainer surface, and positioned slanted against the axis of the rotor; and
a head-to-middle part connecting the head part and the middle part, wherein
the head-to-middle part is retained on and along the slope surface.

4. The motor of claim 3, wherein
an end face of the control portion and a winding retainer surface of the winding portion are perpendicular to the axial direction of the rotor, and
a distance from an end face of the control portion to a winding retainer surface of the winding portion is equal to or greater than a cross-sectional radius of the plurality of windings.

5. The motor of claim 4, wherein
the motor is a brushless motor.

6. A fuel pump for suctioning and discharging a fuel from a fuel tank disposed in a vehicle, the fuel pump comprising:
a motor that includes
a rotor, and
a stator positioned around the rotor and generating a magnetic field to rotate the rotor, the stator including
a plurality of cores made of a magnetic material,
a plurality of windings wound on the plurality of cores, and
a plurality of bobbins, each bobbin electrically insulating each winding of each core, and
each bobbin including
a head part retainer portion retaining a head part of each winding at a circumferential position of the bobbin, the head part of each winding being a starting point of each winding,
a winding portion retaining a middle part of each winding, the middle part being in connection with the head part of each winding,
a control portion extending relative to the winding portion in an axial direction of the rotor from a position between the head part retainer portion and the winding portion, the control portion preventing movement of the middle part of each winding toward the head part retainer portion, and
the head part retainer portion includes a groove that is configured to retain the head part substantially parallel to the axis of the rotor, and wherein
the head part retainer portion includes only one of the groove, and wherein
the groove is circumferentially offset from a center of the winding portion; and
a pump part having a rotation member that is connected to the rotor of the motor.

7. The motor of claim 1, wherein an end face of the control portion and a winding retainer surface of the winding portion are perpendicular to the axial direction of the rotor.

8. The motor of claim 1, wherein the control portion is part of the head part retainer portion.

9. The motor of claim 1, wherein the control portion and the head part retainer portion are one piece.

10. The motor of claim 1, wherein the control portion and the head part retainer portion extend further in the axial direction of the rotor than the winding portion.

* * * * *